(No Model.)

J. LEVY.
COOKING UTENSIL.

No. 261,465. Patented July 18, 1882.

Attest:
Charles Pickles
Sunuel S. Boyd

Inventor:
Jacob Levy
by C. D. Moody
atty

UNITED STATES PATENT OFFICE.

JACOB LEVY, OF ST. LOUIS, MISSOURI.

COOKING UTENSIL.

SPECIFICATION forming part of Letters Patent No. 261,465, dated July 18, 1882.

Application filed June 6, 1882. (No model.)

*To all whom it may concern:*

Be it known that I, JACOB LEVY, of St. Louis, Missouri, have made a new and useful Improvement in Cooking Utensils, of which the following is a full, clear, and exact description, reference being had to the annexed drawings, making part of this specification, in which—

Figure 1:
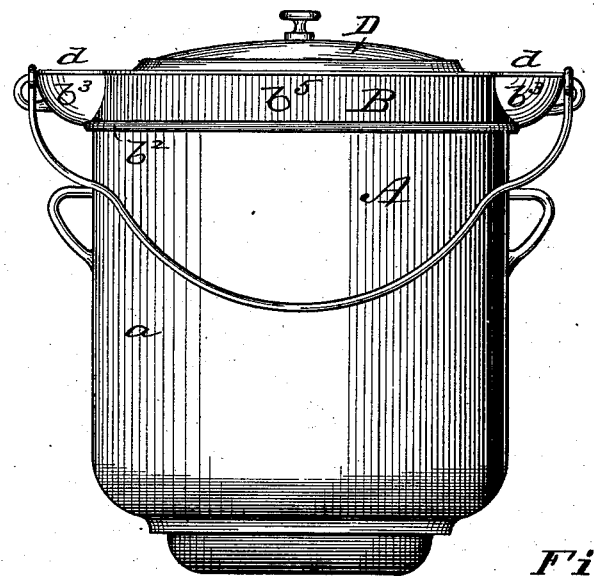
Figure 2:
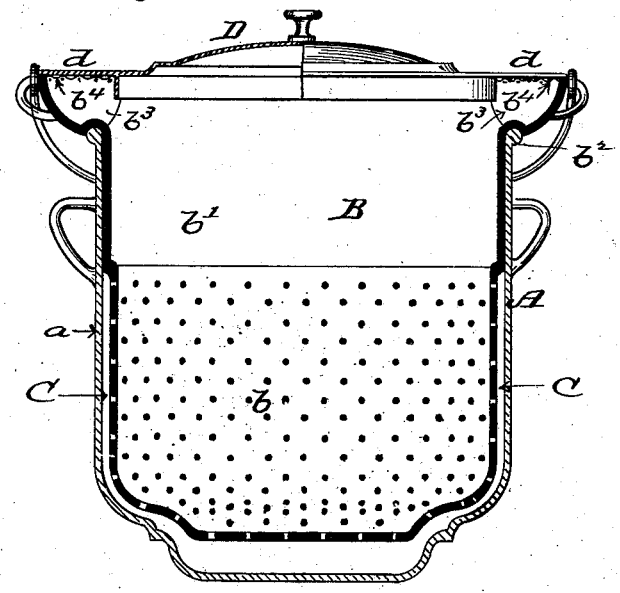

Figure 1 is a side elevation of the improvement; Fig. 2, a vertical section, and Fig. 3 a plan.

The same letters denote the same parts.

The present construction is designed for preparing soups, boiling meats, and cooking vegetables and other articles of food of a liquid nature or requiring a liquid in their preparation.

A represents a pot, the shell $a$ of which is imperforate.

B represents an inner pot, which in use is held in the outer pot. The lower portion, $b$, of the shell of the inner pot is perforated. The upper portion, $b'$, is imperforate. Opposite the lower portion, $b$, there is an annular space, C, between the two pots. Opposite the upper part, $b'$, the shells of the two pots fit closely together. The inner pot, at $b^2$, rests upon the shell of the outer pot. The inner pot is provided with the lips $b^3$ $b^3$, having the strainers $b^4$ $b^4$.

Figure 3:
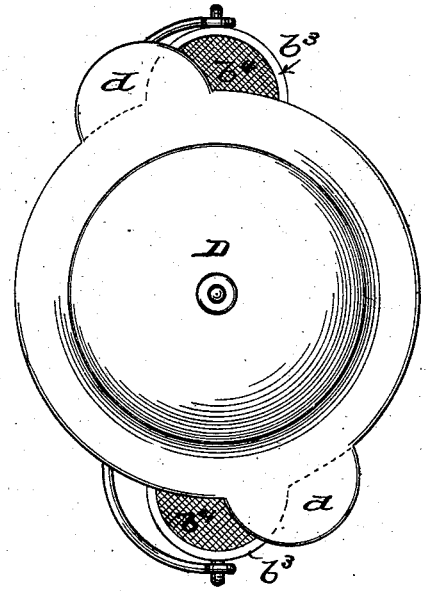

D represents the lid of the inner pot. It is provided with the projections $d$ $d$, which in size, shape, and position correspond to the lips $b^3$ $b^3$. When it is desired to confine the steam or vapor within the utensil the lid is set to cover the entire opening at the top of the inner pot, and when it is desired to let the steam or vapor escape the lid is turned around, so as to expose the strainers $b^4$ $b^4$, as shown in Fig. 3. The strainers, while allowing the vapor to pass out, operate to hold the liquid back within the pot, and thus prevent or hinder its being spilled.

In use the solid materials—for instance, the meat and bones in making soup—are placed within the inner pot, and when the soup has been prepared the inner pot, containing the solid portion of the food, is lifted out of the outer pot. As the inner pot is lifted out the liquid portion of the contents of the utensil strains through the perforated portion $b$ into the outer pot, where it is collected. The portion $b$ of the inner pot being perforated at the side as well as at the bottom enables the liquid portion to readily pass from the inner pot into the outer pot. At the same time, by reason of the portion $b'$ being closed, the liquid portion is not liable, in lifting the inner pot, to be spilled without the outer pot. By reason of the two pots fitting closely together opposite the part $b'$ the steam or vapor cannot escape from the annular space C to without the utensil. The inner pot, B, extends at $b^5$ above the top of the outer pot.

I claim—

1. The combination of the outer pot, A, the inner perforated pot, B, having the lips $b^3$ $b^3$, and the lid D, having the projections $d$ $d$, substantially as described.

2. The combination of the outer pot, A, the inner perforated pot, B, having the lips $b^3$ $b^3$, and the lid D, having the projections $d$ $d$, said pots being relatively shaped to form the annular space C, substantially as described.

3. The combination of the outer pot, A, the inner perforated pot, B, having the lips $b^3$ $b^3$, and extending at $b^5$ above the outer pot, and the lid D, having the projections $d$ $d$, substantially as described.

JACOB LEVY.

Witnesses:
 C. D. MOODY,
 CHARLES PICKLES.